F. RODE.
VEHICLE CHOCK.
APPLICATION FILED MAR. 26, 1913.
1,076,152.
Patented Oct. 21, 1913.
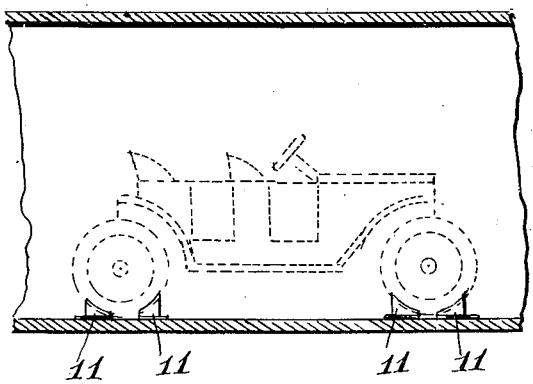
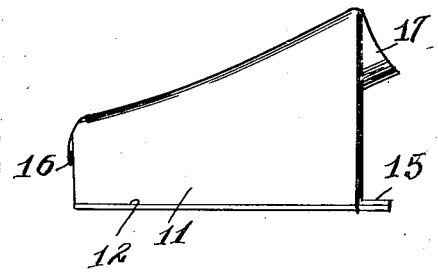
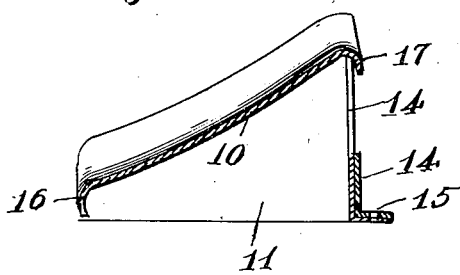
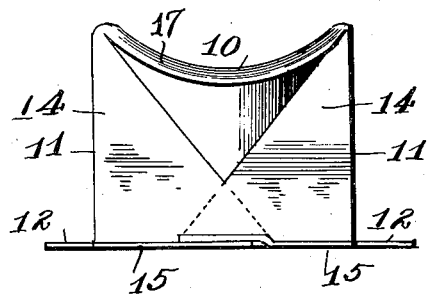
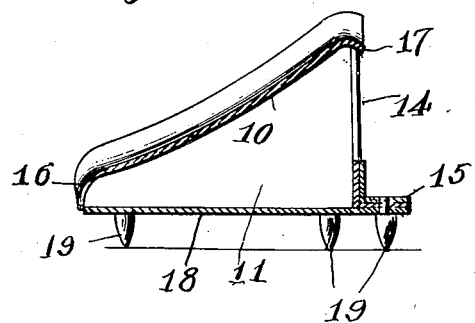
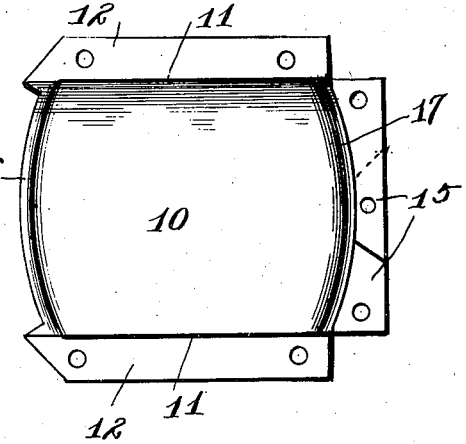
WITNESSES
INVENTOR
Frank Rode
By A. M. Wilson
Attorney

UNITED STATES PATENT OFFICE.

FRANK RODE, OF JEANNETTE BOROUGH, PENNSYLVANIA.

VEHICLE-CHOCK.

1,076,152.	Specification of Letters Patent.	Patented Oct. 21, 1913.

Application filed March 26, 1913. Serial No. 756,908.

*To all whom it may concern:*

Be it known that I, FRANK RODE, a citizen of the United States, and residing at Jeannette Borough, in the county of Westmoreland and State of Pennsylvania, have invented certain new and useful Improvements in Vehicle-Chocks, of which the following is a specification.

This invention relates to certain new and useful improvements in vehicle chocks, and has for its primary object to provide a chock that can be advantageously used either for securing a vehicle against movement on the road when desired, or for securing such vehicle against displacement during shipment of the vehicle.

A further object of the invention is to provide a chock of simple and economical construction, yet which will be strong and durable, and effective for the purpose designed, whether the device be utilized for chocking the vehicle against movement on a hill or for preventing movement of the vehicle in a car in which the vehicle may be housed.

With the above and other objects in view, the invention consists in the novel construction, combination, and arrangement of parts, as will be hereinafter more fully described, and then particularly claimed, and in describing the invention in detail, reference is had to the accompanying drawings, illustrating a preferred embodiment of the invention wherein:—

Figure 1 is a sectional diagrammatical view illustrating an automobile housed within a car for shipment and held against movement by means of chock blocks in accordance with this invention. Fig. 2 is an enlarged view in side elevation of the form of chock used to secure a car against movement during shipment. Fig. 3 is a longitudinal sectional view of the same. Fig. 4 is a rear elevation of the chock. Fig. 5 is a longitudinal sectional view of a chock provided with a supporting base having feet or spurs, adapting the chock for use particularly on roads, and, Fig. 6 is a top plan view of the chock.

Throughout the description, like parts will be designated by similar reference characters.

As will be understood, the invention is particularly adapted for use in connection with the shipment of vehicles such as automobiles, where it is desired after the same have been positioned within a car, that they be securely held against shifting from such position, and damaging other adjacent vehicles or the property stored in the same car.

The chock as illustrated in Figs. 1 to 4 and 6 is formed from a sheet of metal, preferably sheet steel of the desired gage. This sheet after being blanked out is dished or concaved longitudinally and transversely to form a tire-engaging portion 10 conforming to and adapted to fit with the wheel tire. The portions of the blank lying beyond the tire-engaging portion 10 are bent downwardly at right angles to form the sides 11, the marginal edges of such sides being bent outwardly to form flanges 12, provided with one or more holes through which nails or equivalent fastening devices are passed into a car floor as shown in Figs. 1 and 3 for securing the chock to such floor.

The chock having the tire engaging portions shaped to fit the tire, the side walls 11 are necessarily somewhat triangular in form, having a relatively high outer or rear end and a relatively low or inner end. The portions of the blank lying to the rear of the tire engaging portion are bent inwardly in overlapping relation and form rear supporting walls 14, which, like the walls 11 have their lower marginal edges turned outwardly at right angles to form flanges 15 preferably provided at the overlapping portions at least with nail holes like the flanges 12. At its inner or lower end, the tire engaging portion 10 is curved downward and slightly inwardly forming a lip 16 so as not to present any sharp edges to the tire, and at its outer or high end has a similar lip 17 for a similar purpose.

In the construction shown in Fig. 5, the formation of the body of the chock is identical with that above described for the form of chock shown in Figs. 1 to 4, but the body is mounted upon a base plate 18 which has openings adjacent its edges registering with the openings in the flanges 12, 15, in which are mounted feet or spurs 19. This construction of device while it may be employed for chocking the wheels of a car in the same manner as in Fig. 1, is particularly adapted for use on the road, the feet or spurs providing a grip or purchase not afforded under such conditions by the device shown in Figs. 1 to 4 and 6.

Having fully described my invention, what I claim as new is:—

1. A vehicle chock consisting of a body formed from a blank of sheet metal bent to provide a tire-engaging portion concaved longitudinally and transversely and having the portions outside the tire-engaging portion bent downwardly to form supporting side walls, the portion of the blank at the rear end of said walls being bent inwardly at right angles to the side walls, to form rear walls, and flanges along the base of said walls having openings therein.

2. A chock for vehicles comprising a base member and a body member, the body member formed from a single blank bent to provide side walls and overlapping walls at one end, the portion of the blank between the side walls being concaved transversely and longitudinally, and rivets securing the body-portion to the base member and constituting feet for the chock.

In testimony whereof I affix my signature in presence of two witnesses.

FRANK RODE.

Witnesses:
E. C. CURRY,
H. V. ROWAN.